United States Patent [19]
Mos et al.

[11] Patent Number: 5,780,828
[45] Date of Patent: Jul. 14, 1998

[54] INTERACTIVE VIDEO SYSTEMS

[75] Inventors: Robert Mos; Clay Von Mueller, both of San Diego, Calif.

[73] Assignee: DH Technology, Inc., San Diego, Calif.

[21] Appl. No.: 602,247

[22] Filed: Feb. 15, 1996

[51] Int. Cl.$^6$ .............................. G06K 7/08; G06K 7/00; G11B 5/127
[52] U.S. Cl. ........................... 235/449; 235/486; 360/113
[58] Field of Search ..................................... 235/449, 380, 235/453, 381, 382, 486; 360/113, 124, 123, 63

[56] References Cited

U.S. PATENT DOCUMENTS

| | | | |
|---|---|---|---|
| 3,898,689 | 8/1975 | D'Orazio et al. | 340/40 |
| 3,949,193 | 4/1976 | Dowdell | 235/61.11 D |
| 4,650,978 | 3/1987 | Hudson et al. | 235/380 |
| 4,858,116 | 8/1989 | Gillett, Jr. et al. | 364/200 |
| 5,091,961 | 2/1992 | Baus, Jr. | 382/7 |
| 5,235,166 | 8/1993 | Fernadez | 235/449 |
| 5,317,137 | 5/1994 | Wilkins | 235/380 |
| 5,397,886 | 3/1995 | Mos et al. | 235/475 |
| 5,535,216 | 7/1996 | Goldman et al. | 370/100.1 |
| 5,650,606 | 7/1997 | Baus, Jr. | 235/449 |

FOREIGN PATENT DOCUMENTS

| | | | |
|---|---|---|---|
| 2428874 | 1/1980 | France | G06K 7/08 |
| 1224251 | 3/1971 | United Kingdom | G06K 1/14 |
| 2015794 | 9/1979 | United Kingdom | G06K 7/08 |

Primary Examiner—Donald T. Hajec
Assistant Examiner—Thien Minh Le
Attorney, Agent, or Firm—Baker, Maxham, Jester & Meador

[57] ABSTRACT

A method and apparatus for reading and writing data to a medium which moves at an uncontrolled velocity relative to a read/write apparatus with which the data is read and written. The read/write apparatus comprises one write head and two read heads. The first read head is spaced apart from the second read head by an odd integer multiple of one half of a bit cell. The two read heads read preexisting data from the medium and generate a write clock which is used to synchronize a write operation using the write head. Delay logic ensures that the write head is over that portion of the medium on which new data is to be written. By measuring the amount of time between detection of a transition at the first read head and detection of that transition at the second read head, the velocity of the medium with respect to the read/write apparatus is determined and the amount of time that must elapse between the reading of old data and the writing of new data which overwrites the old data is determined. A write clock decoder receives a pulse associated with each transition read by either the first or the second read head, and outputs a write clock synchronized to the velocity of the read/write apparatus with respect to the medium based upon these received pulses. By spacing the two read heads apart by an odd multiple of one half the bit cell, either the first or the second read head will always detect a transition at each half bit cell. Thus, the write clock will have a transition each half bit cell.

16 Claims, 12 Drawing Sheets

INTERACTIVE VIDEO SYSTEMS

BACKGROUND OF THE INVENTION

1. Field of the Invention

This invention relates to information processing, and more particularly to a method and apparatus for reading and writing information on magnetic media, including magnetic stripes provided on credit cards, bank cards, debit cards, identification cards, etc.

2. Description of Related Art

Cards which have a magnetic stripe attached thereto are ubiquitous in modern society. That is, nearly everyone carries at least one of the following cards, each of which typically has a magnetic stripe attached thereto: credit cards, bank cards (ATM cards), debit cards, identification cards, driver's licenses, security access cards, check cashing cards, etc. Data is typically represented on a magnetic medium by polarizing magnetic particles of the magnetic medium in one of two magnetic states. When reading the data from the magnetic medium, transitions between the two states are detected as pulses, with transitions between a first state and a second state being detected as positive pulses, and transitions between the second state and the first state being detected as negative pulses.

One commonly used means for encoding data on the magnetic stripe of such cards is referred to as the Aiken code (or two frequency coherent phase code). In accordance with the Aiken code, data is written in a manner which allows a clock to be decoded from the data, and thus makes the reading of the data possible with a single read head and no clock track on the magnetic medium. In accordance with the Aiken code, regular transitions occur at evenly spaced bit cells. In order to allow the most accurate reading of the data, these bit cells are carefully controlled to be as nearly equal as possible. Additional transitions occur halfway between these regular transitions if the data represented in that bit cell is in a first logical state (such as a logical "one"). No transition occurs between the transitions that define a regular bit cell if the data represented in that bit cell is in a second logical state (such as a logical "zero"). The transitions that occur between bit cell transitions are also very carefully controlled to allow accurate reading of the data. Accordingly, the regular transitions which define each bit cell provide the clocking information, while the transitions that occur during the defined bit cells provide the logical state of the data. It should be noted that the particular instantaneous polarity of the magnetic information is not relevant, but only the occurrence or absence of a transition in the magnetic polarity is of significance.

FIG. 1 is an illustration of the output from a read head detecting data which has been encoded using the Aiken code. As shown in FIG. 1, the bit cells (designated by vertical lines 100) are shown to be equally spaced over the entire data pattern. Such would be the case if the magnetic media were moving at constant velocity with respect to the read head. In the present example, logical zeros are indicated by the fact that no transition occurs in the middle of the bit cells, and logical ones are indicated by the fact that one transition occurs in the middle of the bit cells. Accordingly, the first bit 101 is a logical zero and the second bit 103 is a logical one.

Typically, a decoder is provided which converts the Aiken code data into more conventional data, such as a digital bit stream in which logical ones are represented by a first voltage level, and logical zeros are represented by a second voltage level. Initially, the data must be separated from the clock information. That is, those transitions which occur at the boundaries of the bit cells must be separated from those transitions which represent the logical state of the data. The simplest method for decoding the Aiken code data requires that the medium move at constant velocity with respect to the read head. Thus, by knowing the relative velocity of the read head and the length of a bit cell, the decoder provides a bit clock and determines whether a transition has occurred at a half or full bit cell. Each time a transition occur within a bit cell, a logical one has been detected. Each time no transition occurs within a bit cell, a logical zero has been detected. The data and clock are then output from the decoder to indicate the value of the data stream. While this method of decoding is reliable, the need to maintain a constant velocity between the medium and the read head is a severe limitation which makes the apparatus required to read data relatively expensive.

Within certain limits a reliable means for decoding the data can be accomplished without constant velocity. Each bit cell transition is timed and the output from that timer is used to test the next transition time for a logical one or zero. After the transition is determined to be a logical one or zero, the output from the transition timer can be used to test the next transition time. Preferably, the speed variation from one bit cell time to the next does not exceed ¼ bit cell time minus bit cell placement and read inaccuracies. One reliable means for decoding the data without regard for the velocity of the media with respect to the read head requires the use of two read heads spaced three quarters of a bit cell apart. This technique is referred to as "spatial decoding". In the case of data written at 210 bits per inch (bpi), each bit cell is 0.00476 inches long. Accordingly, the two read heads are spaced approximately 0.00357 inches apart. In the case of data written at 75 bpi, the bit cells are each 0.0133 inches long. Therefore, the read heads are spaced approximately 0.010 inches apart. In some applications of spatial decoding, the head spacing is exaggerated slightly to increase jitter tolerance. That is, by increasing the distance between the read heads slightly, transitions which occur slightly later than the exact center of the bit cell will not be missed. This will become clear upon the following discussion of spatial decoding.

FIG. 2 is an illustration of a circuit disclosed in U.S. Pat. No. 3,898,689, issued to Robert D'Orazio used to perform conventional spatial decoding. As with any type of magnetic reading, the signal output from each read head must be amplified and then differentiated or integrated (or preferably both). A current to voltage amplifier is used in combination with a high head inductance to perform the integration and provide automatic gain control. The signals output from the read heads are each applied to a voltage comparator which outputs a generally square-wave output signal. These square-wave signals are then coupled to a decoding logic circuit which decodes the data.

While spatial decoding solves the problem of reading data when the velocity of the medium with respect to the read head varies, the data still must be written relatively precisely, in order to ensure that the data can be decoded without error. That is, the velocity of the medium with respect to the write head still the must be accurately controlled or known at each point in time during the write procedure. Currently, data is written to a magnetic medium using the Aiken code by controlling the velocity of the medium with either relatively expensive motor drives or by measuring the velocity at each point in time by placing a wheel in contact with the medium, or a substrate to which the medium is secured, such as a debit card, such that the rotational speed of the wheel indicates the instantaneous velocity of the medium. Both of these methods for controlling or detecting the velocity of the medium and writing data in response to the velocity of the medium are relatively expensive and require sophisticated circuits and hardware. Furthermore, modifying data that is embedded within the data which is already written on the medium is very difficult. Typically in the case of a magnetic stripe, all the data must be read from any track of the medium which has data to be modified, then the new data must be inserted into the data stream in place of the old data, and finally, the entire data package must be written back onto the card. This is due to the fact that the exact placement of data with respect to the data that already exists on the medium is very difficult. In systems which use high power apparatus to write data, the need to rewrite data which has not been modified can be relatively expensive and wasteful.

The process of modifying data is becoming more important recently, due to interest in the use of debit cards which carry a balance that is decremented at each purchase. Accordingly, it would be desirable to provide a method and apparatus for writing data to a magnetic medium which does not require the medium to move at a controlled or known velocity with respect to the write head responsible for writing the data. Furthermore, it would be desirable to provide a system in which unmodified data need not be rewritten when other portions of data stored on adjacent sections of the same medium are modified.

SUMMARY OF THE INVENTION

The present invention is a method and apparatus for reading and writing data to a medium which moves at an uncontrolled velocity relative to a read/write apparatus with which the data is read and written. In accordance with one embodiment of this invention, the read/write apparatus comprises one write head and two read heads. The first read head is spaced apart from the second read head by an odd multiple of one half of a bit cell. The write head is spaced a predetermined distance from the second read head. The two read heads read preexisting data from the medium and generate a write clock which is used to synchronize a write operation using the write head. Delay logic ensures that the write head is over that portion of the medium on which new data is to be written. By measuring the amount of time between detection of a transition at the first read head and detection of that transition at the second read head, the velocity of the medium with respect to the read/write apparatus is determined and the distance that the write head must travel between the reading of old data and the writing of new data which overwrites the old data is determined. A write clock decoder receives a pulse associated with each transition read by either the first or the second read head, and outputs a write clock synchronized to the velocity of the read/write apparatus with respect to the medium based upon these received pulses. By spacing the two read heads apart by an odd multiple of one half the bit cell, either the first or the second read head will always detect a transition at each half bit cell. Thus, the write clock will have a transition each half bit cell. This can be understood by noting that when no transition occurs between the bit cell as read by the first read head, the second head will be at a bit cell boundary, and thus a transition will be detected by second read head. Accordingly, the write clock can be used to accurately identify when transitions are to occur when writing data.

In accordance with a second embodiment of this invention, old data (i.e., data which was previously written) is read by either one of the read heads. New data (i.e., data to be written to the medium) is compared with old data. Only if the new data differs from the old data is the new data to be written. Once a determination is made that the new data differs from the old data, the new data is written from that point forward. Since the polarization of the data is dependent upon whether the number of zeros which have preceded is odd or even, writing the data starting at the point of change and continuing to the end ensures that the data that follows a change will not be disturbed. That is, each time a zero is written, the polarity of the magnetic field at the beginning of the next bit cell is reversed. However, writing a one does not reverse the polarity at the beginning of the next bit cell. Therefore, if the data that is modified has an odd number of zeros, then the polarity of each of the magnetic states that follow will be reversed.

In accordance with a third embodiment of this invention, only new data is written, unless the polarity of the old data which follows the new data would be reversed. The determination as to whether the old data that follows the new data would be reversed is made based upon the number of zeros that occur in the old data that has been overwritten and the number of zeros that occur in the new data that has overwritten that old data.

In accordance with a fourth embodiment of this invention, new data may be written on a medium on which data has not previously been written. In this embodiment, a write head precedes the read heads, and a high frequency pattern of transitions is written. The read heads then read this high frequency pattern and derive a write clock therefrom.

In accordance with a fifth embodiment of this invention, a second write head is positioned behind the two read heads. After the read heads derive a write clock from a high frequency pattern written by a first write head in manner similar to the fourth embodiment, the second write head begins writing the new data. Thus, the new data overwrites the high frequency pattern.

In accordance with a sixth embodiment of this invention, one of the read heads is used as a write head as well. Thus, after the high frequency pattern has been detected and the write clock has been derived, the first write head writes a pattern of all ones (i.e., ensures that transitions occur at twice the bit rate). The read head then derives the write clock from this pattern of ones and the second write head overwrites the pattern of ones with the new data.

BRIEF DESCRIPTION OF THE DRAWING

The objects, advantages, and features of this invention will become readily apparent in view of the following description, when read in conjunction with the accompanying drawing, in which.

DETAILED DESCRIPTION OF THE PREFERRED EMBODIMENTS

Throughout this description, the preferred embodiment and examples shown should be considered as exemplars, rather than limitations on this invention.

Overview

This invention is a method and apparatus for reading and writing data using a self clocking data pattern, such as the Aiken code. In accordance with this invention, the velocity of the write head need not be constant with respect to the medium during the write operation. A write clock is generated by offsetting two read heads by an odd integer multiple of one half of a bit cell and combining the outputs therefrom by detecting each transition of each output and combining these transitions by a logical OR function. Accordingly, a write clock can be generated from data which is already present on the medium. Furthermore, by writing data at a high frequency and then reading that data back, the velocity of a read/write apparatus can be determined. Once the velocity of the read/write apparatus can be determined, a write clock can be generated. These observations are embodied in this invention as described below.

First Embodiment

Figure 1:
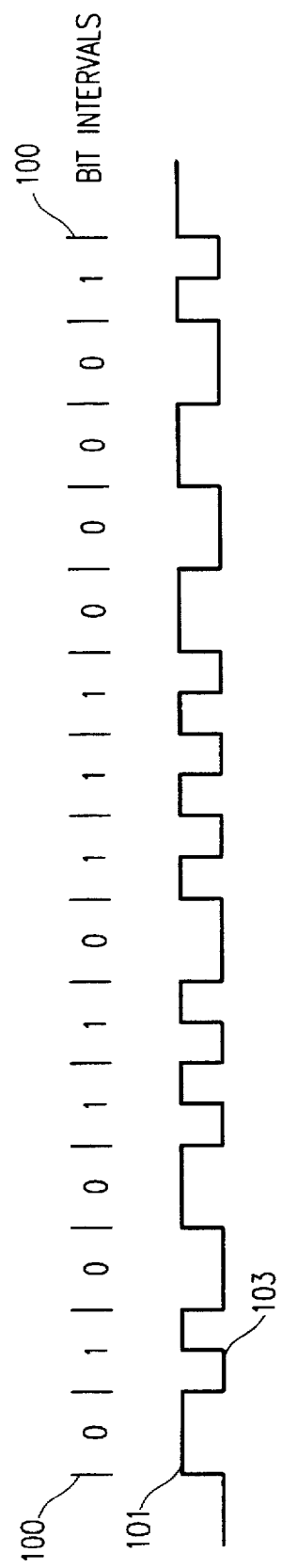
FIG. 1 is an illustration of the output from a read head detecting data which has been encoded using the Aiken code.
Figure 2:
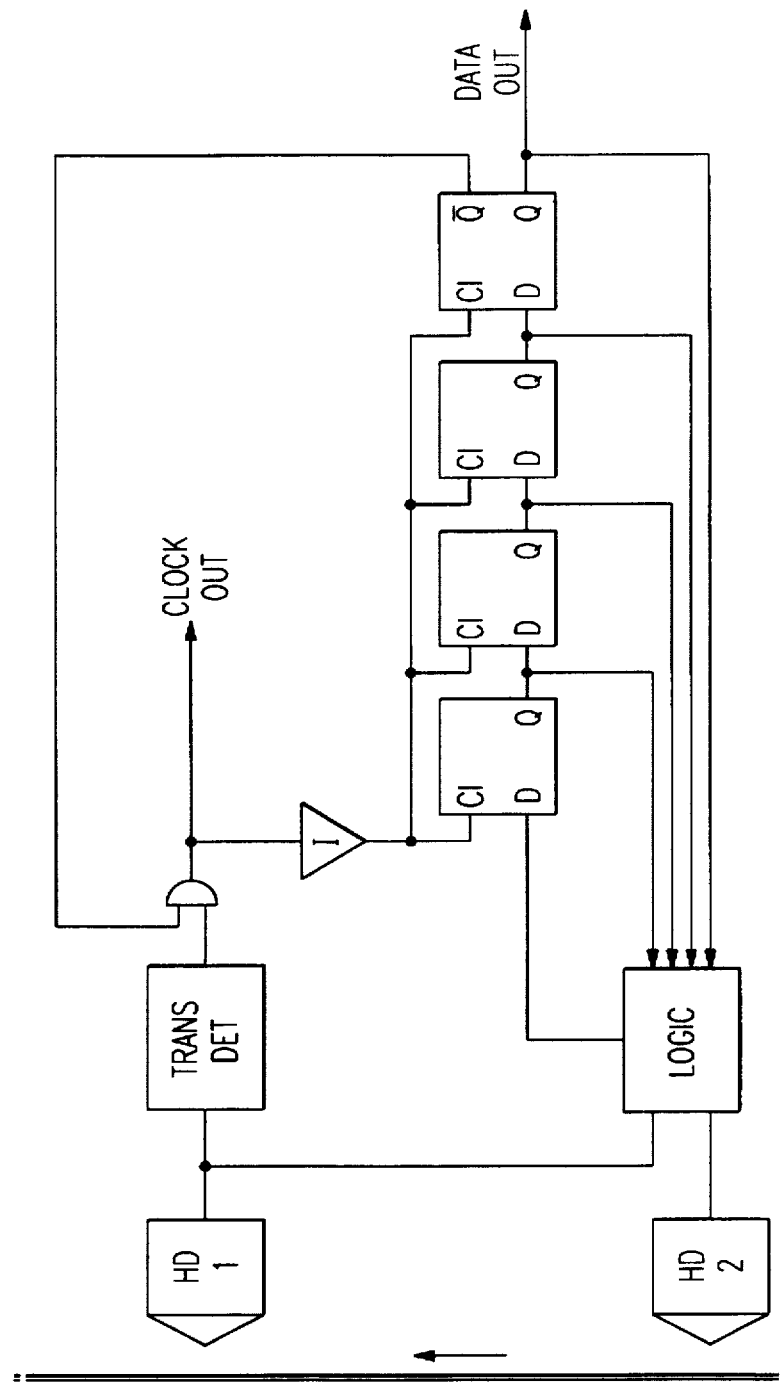
FIG. 2 is an illustration of a prior art circuit used to perform conventional spatial decoding.
Figure 3:
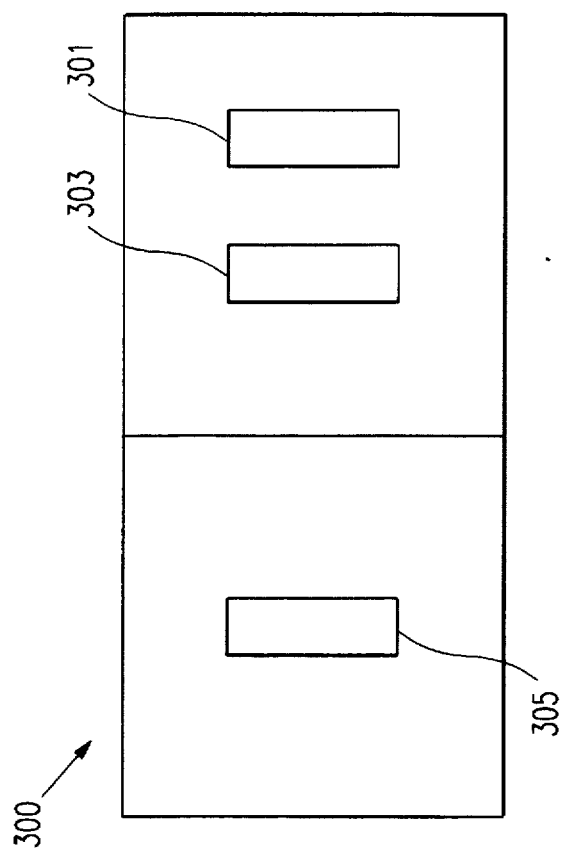
FIG. 3 is an illustration of the relative locations of two read gaps and a write gap formed within a read/write apparatus in accordance with one embodiment of this invention.

FIG. 3 is an illustration of the relative locations of two read gaps 301, 303 and a write gap 305 formed within a read/write apparatus 300 in accordance with one embodiment of this invention. The read/write apparatus 300 is similar to conventional read/write heads, with the exception of the spacing between the read and write gaps 301, 303, 305. As is well known in the art of reading and writing data on a magnetic medium, a magnetic field is generated across a gap in the magnetic core material of a write head. The magnetic field is typically generated by applying a current through a coil wound around the magnetic core material. The field that is generated is sufficiently strong to polarize magnetically sensitive particles at the surface of a magnetic medium over which the write head passes. When a read head passes over the magnetically polarized particles of the medium, changes (commonly referred to as "transitions") in the magnetic field generate a current in a coil wound around a magnetic core material of the read head.

Figure 4:
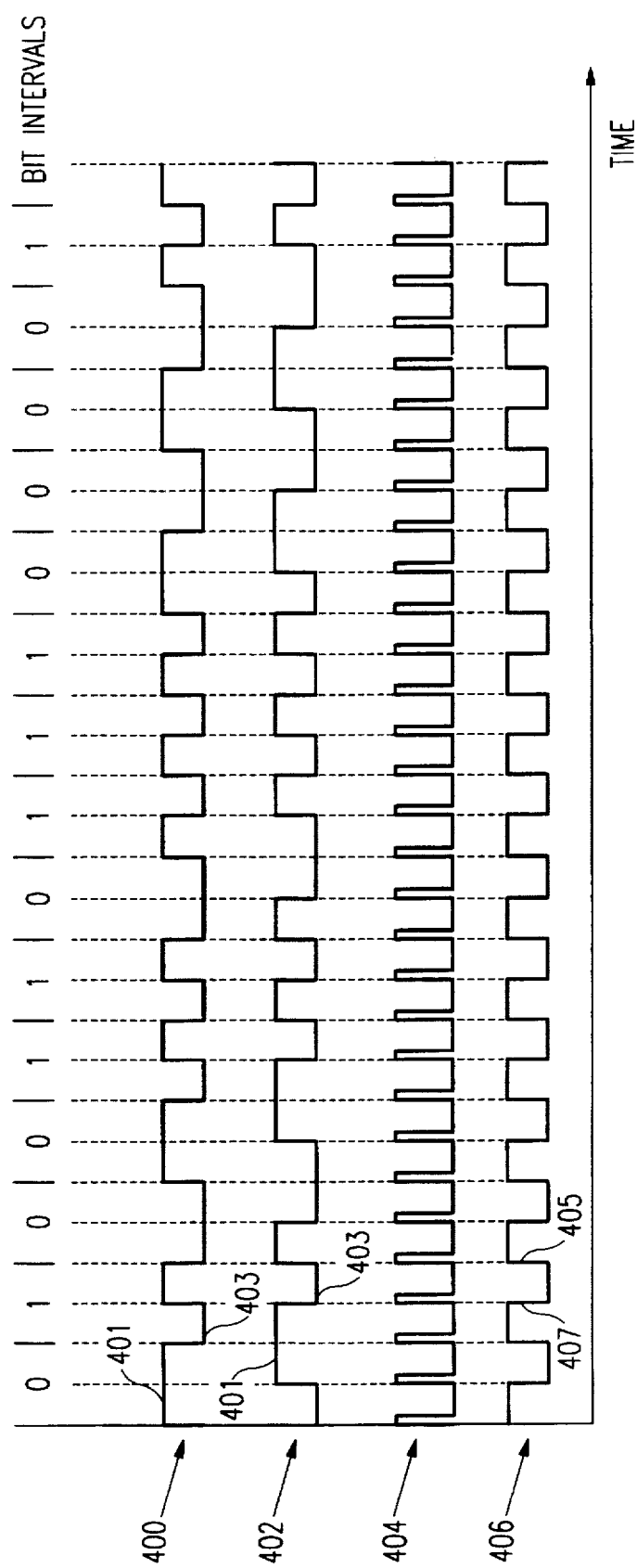
FIG. 4 is a timing chart which illustrates the relationship between data read by first and second read heads in accordance with this invention.
Figure 5:
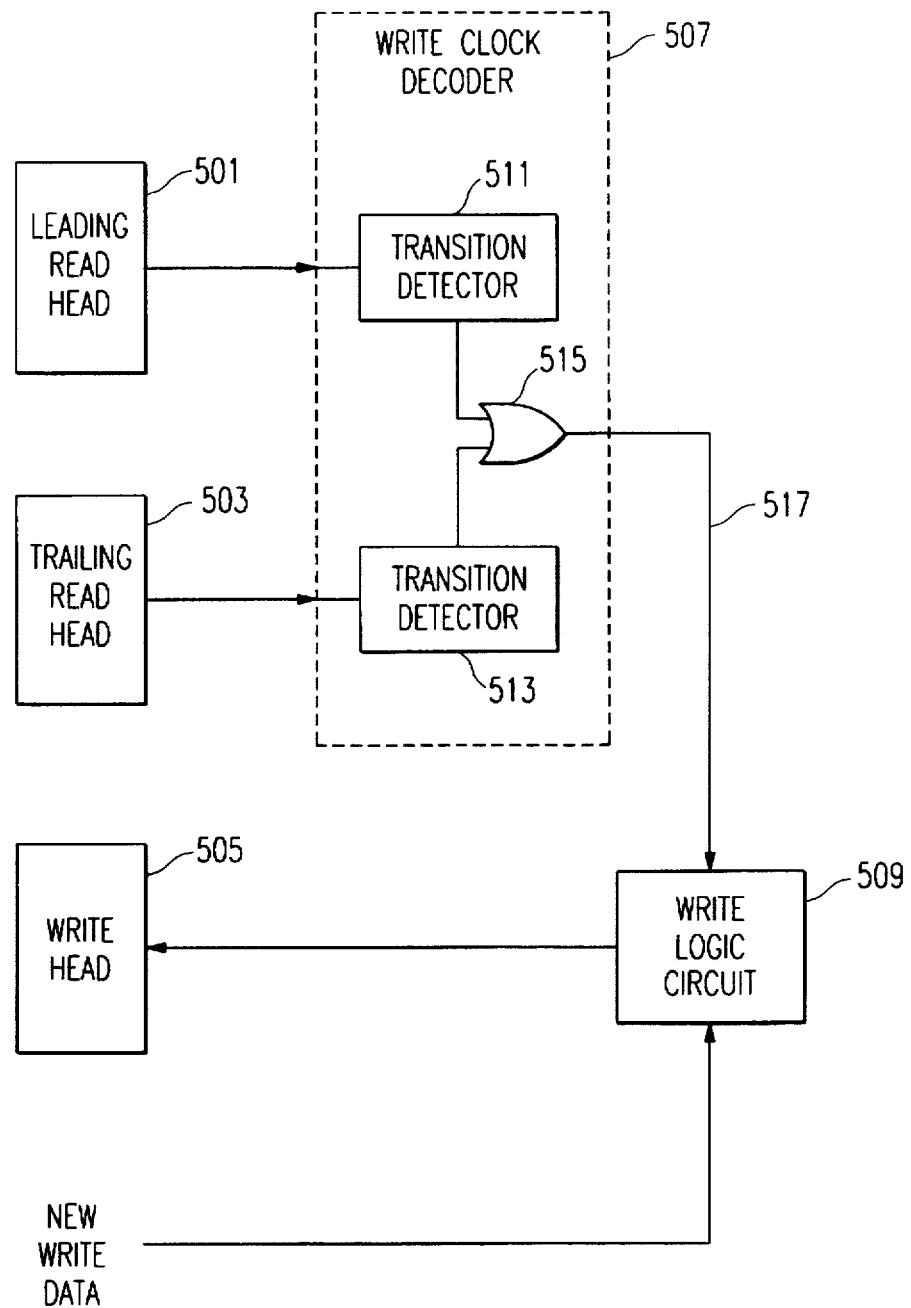
FIG. 5 is a block diagram of the elements of the first embodiment of this invention, which includes a leading read head, a trailing read head, a write head, a write clock decoder, and write logic.

In accordance with the first embodiment of this invention, two such read gaps 301, 303 and one such write gap 305 are provided. The spacing between the longitudinal center lines of the read gaps 301, 303 is preferably an odd multiple of one half the bit cell distance (e.g., ½, 1½, 2½, ...). Bit cells are defined as the predetermined distance between clock transitions, when the data is written in a particular self-clocking code, such as Aiken code, in which a data transition occurring halfway between such clock transitions indicates a first logic state, and in which no transitions occurring between clock transitions indicates a second logic state. FIG. 4 is a timing chart which illustrates the relationship between data read by the first and second read heads. FIG. 5 is a block diagram of the elements of the first embodiment of this invention, which includes a leading read head 501, a trailing read head 503, a write head 505, a write clock decoder 507, and write logic 509. It should be noted that the waveforms 400, 402 shown in FIG. 4 are not the waveforms that are directly output from the read heads, but rather are those waveforms which appear at the output of a wave shaping circuit which causes a square wave to be output. The output has transitions from a high state 401 to a low state 403 or from a low state 403 to a high state 401 occurring each time a read head detects a transition from one polarity to the other. In the present description, the read heads 501, 503 are assumed to include all necessary circuitry to output such signals, including amplifiers and waveshaping circuitry. The output 400 is from the leading read head 501 (which includes the read gap 301), and the output 402 is from the trailing read head 503 (which includes read gap 303). It can be seen that if a pulse is generated each time either the output 400 or the output 402 changes state, then the clock will be reconstructed, as shown by waveform 404. The falling edge of these pulses can be used as a read clock. These pulses can also be used directly as a write clock. Further, the waveform 404 may be used to generate a write clock 406 with a frequency that is equal to the data rate when the data is all ones, and which has a 50% duty cycle, such that the rising edge 405 of the clock occurs at the beginning of each bit cell, and falling edge 407 of the clock occurs midway through each bit cell (i.e., at the times when data transitions are to occur).

In accordance with one embodiment of this invention, the waveform 404 can be produced by applying the waveform 400 and the waveform 402 each to a transition detector 511, 513. The outputs from each transition detector are then coupled to the inputs of a two input OR-gate 515. The output of the OR-gate is write pulse waveform 404.

In accordance with one such transition detector, the waveform 400 is applied to one of two inputs of a two input exclusive OR-gate and the waveform 402 to the other input, with one of the inputs being delayed by the desired length of the pulses to be generated. One well known method for delaying a signal is to perform a double inversion. Alternatively, each waveform 400,402 can be applied to a dual edge triggered monostable multivibrator (or "one-shot") which produces a pulse each time the waveform 400,402 transitions either high or low. Each output from the two one-shots is then applied to a different one of the two inputs of a two input OR-gate. In still another transition detector, the waveform 402 is applied to both a positive edge triggered one-shot and a negative edge triggered one-shot. Each of the outputs are then coupled to a two input OR-gate. Due to the OR-gate 515, if either of the two waveforms 400, 402 transition either from a high to low or low to high, a pulse is generated. It will be understood by those skilled in the art that the pulse must be shorter than one half the bit cell when the read head is moved at maximum velocity with respect to the medium.

In an alternative embodiment of this invention, the distance between the first and second read gaps 301, 303 may be any predetermined distance. However, if the distance between the first and second read gaps 301, 303 is other than half a bit cell, then the information that is read from the trailing read gap 303 must be delayed to simulate the data being received at a read gap which is an odd multiple of one half bit cell away from the leading read gap 301. For example, if the read gaps 301, 303 are spaced apart ¼ of a bit cell, then the information that is read by the trailing read gap 303 must be delayed by twice the time between reading a transition at the leading read gap 301 and reading the same transition at the trailing read gap 303. Likewise, if the leading read gap 301 is spaced 1 bit cell from the trailing read gap 303, then the information that is read from the trailing read gap is delayed by 50% of the time between receipt at the leading read gap 301 and the trailing read gap 303. It will be clear to those skilled in the art that such a delay can be implemented by either a programmable processing device which reads the input signal and generates an output signal with the appropriate delay, or by a programmable delay circuit designed from discrete components. Such programmable delay circuits are well known in the art. Once the two signals are delayed such that they are offset by an odd multiple of one half the bit cell, the signals are combined as described above to generate the write pulse waveform 404.

The write pulse waveform 404 is coupled from the write clock decoder 507 to the write logic 509 over signal line 517. The write logic 509 uses the write pulse waveform 404 to determine when to change the polarity of the magnetic field that polarizes the medium (i.e., when to "write" a "transition" to the medium). In one embodiment of this invention, the write logic 509 keeps track of which pulses are coincident with a clock transition and which are coincident with a data transition. It will be understood that data transitions are only written when the data associated with the particular bit cell is in the first of the two logical states (such as a logical one) and not in the second logical state (such as a zero). However, in accordance with the Aiken code, clock transitions are written every other pulse of the write pulse waveform 404 without fail. The write logic 509 controls the write head 505 to cause the transitions to be written to the medium.

Second Embodiment

Figure 6:
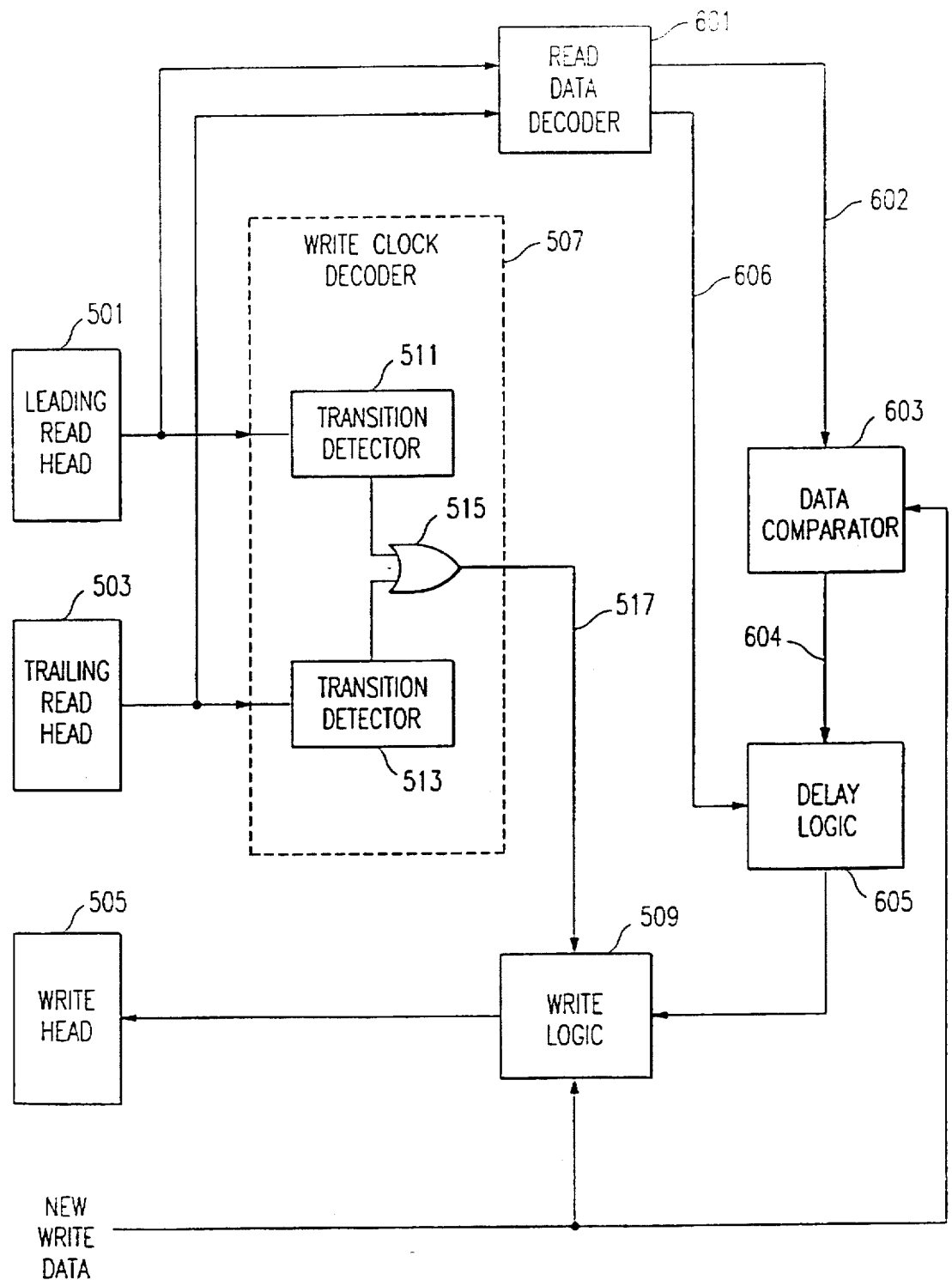
FIG. 6 is a functional block diagram of a second embodiment of this invention.

FIG. 6 is a functional block diagram of a second embodiment of this invention. In accordance with the second embodiment of this invention, a read data decoder 601 is coupled to each of the read heads 501, 503. The decoder 601 decodes the information read by each of the heads 501, 503. While the read data decoder preferably receives data from both the leading and trailing read heads 501, 503, only one stream of data is output from the read data decoder 601. The redundancy provided by the leading and trailing read heads 501, 503 can be used to verify the accuracy of the data. In addition, the read data decoder 601 determines the velocity of the read/write head over the magnetic medium by measuring the delay between the time data is read from the leading read head 501 and the time the same data is read from the trailing read head 503. The amount of time between receipt of a transition at the leading read head 501 and receipt of that transition at the trailing read head 503 will determine the velocity of the read/write head over the medium. A high frequency clock (e.g., approximately 100 times the frequency of the bit rate) may be used to determine and to characterize the velocity. For example, the number of periods of the high frequency clock that have occurred starting upon detection of a transition at the leading read head 501 and ending upon detection of a transition at the trailing read head 503 can be used to characterize the velocity of the read/write head 300 over the medium. As was discussed above, the exact distance between the read heads can differ from an odd multiple of ½ the bit cell. However, accurate spacing of the read heads at odd multiples of ½ the bit cell provides the most accurate measure of the velocity. By tracking the velocity over a period of time, a history can be established which allows acceleration and deceleration trends to be detected. These trends can be used to forecast the velocity over the next bit cell. Since the inertia of the medium (assuming it is the medium that is in motion) is relatively large, the velocity of the medium with respect to the read/write apparatus will not change rapidly. Therefore, assuming the measurement is initially accurate, a relatively accurate prediction of the point in time at which the next half bit cell boundary will occur can be made. Since new information as to the amount of time required to traverse a half bit cell is taken every half bit cell, the accuracy is maintained over time.

The data which had been decoded by the read data decoder 601 (i.e., the "old" data) is coupled to a data comparator 603 over signal line 602. The data comparator 603 indicates when the read data decoder 601 begins reading the old data. The data comparator 603 also compares the old data with the data that is to be written (i.e., the "new" data). As shown in FIG. 6, the new data may be coupled directly to the data comparator 603. However, alternatively the new data may be provided through write logic 509. Upon detecting that the trailing read head 503 has begun reading the old data, the data comparator 603 asserts a "Begin" signal to delay logic 605 over signal line 604. Further, upon detection that the new data differs from the old data, the data comparator 603 asserts a "Write" signal to the delay logic 605 over signal line 604. The delay logic 605 also receives information from the read data decoder 601 over signal line 606 that indicates the velocity of the read/write head with respect to the magnetic medium. This velocity information may take the form of a number of clock pulses, where the clock is a reference clock having a known frequency. In accordance with one embodiment, the read data decoder 601 starts counting the number of such clock pulses each time either of the inputs transitions, and stops counting the next time one of the inputs transitions.

The delay logic 605 asserts a "Begin" command to the write logic 509, as well as a "Write" command. The Begin command is delayed from the time the Begin signal is asserted over signal line 604. The amount of the delay is based upon the spacing between the write head 505 and the read heads 501, 503 from which the data provided to the comparator was read. Likewise, the Write command is delayed from the time the Write signal is asserted by the data comparator 603. Each such delay is preferably equal to the time required for a particular portion of the magnetic medium to move from the trailing read head 503 to the write head 505. Accordingly, when the write logic 509 receives the Write command, the write head will be properly positioned over the area of the magnetic medium to which the new data is to begin writing in order to overwrite the old data with the new data starting at the point at which the new data differs from the old data. The write logic 509 uses the write pulse waveform 404 to maintain synchronization between the old data and the new data. For example, in one embodiment of this invention, upon receipt of the Begin command at the write logic 509, the write logic begins attempting to write the new data, but does not enable the write head 505 until the delay logic sends the Write command. Once the Write command is received at the write logic 509, the new data overwrites the old data until the end of the write cycle. Preferably, the write cycle does not end until all of the remaining old data which is contiguous with the changed data has been overwritten. In this context, a first bit of data is "contiguous" with a second bit of data, if a change from a logical one to a logical zero in the first bit of data would affect the magnetic polarity of the second bit of data. By overwriting each contiguous bit of data starting from the point at which the new data differs from the old data, the number of zeros in the new data need not be counted and will have no effect on the contiguous data that follows.

Third Embodiment

In accordance with a third embodiment of this invention, in addition to communicating a Begin command and a Write command, the delay logic 605 issues an "End" command. The End command is issued after a Write command has been issued, and in response to an "End" signal from the data comparator 603. The End signal indicates that the old data and the new data are once again equal. As is the case with the Begin and Write commands, the End command is delayed from the End signal by an amount of time equal to the time required for the write head to be positioned over the old data which differs from the new data. If the difference between the number of zeros that have occurred in the old data and the number of zeros in the new data is even, then the polarity of the old data will not have changed as a result of the new data being written. However, if the difference between the number of zeros in the new data and the number of zeros in the old data is an odd number, then the polarity of the remaining contiguous data will be the opposite of what it was before the new data was written. Accordingly, all of the remaining contiguous data must be rewritten even though the logical states of the data represented are the same. In one embodiment, the data comparator 603 calculates the difference in the number of zeros, and suppresses the End signal if the difference is odd.

Fourth Embodiment

Figure 7:
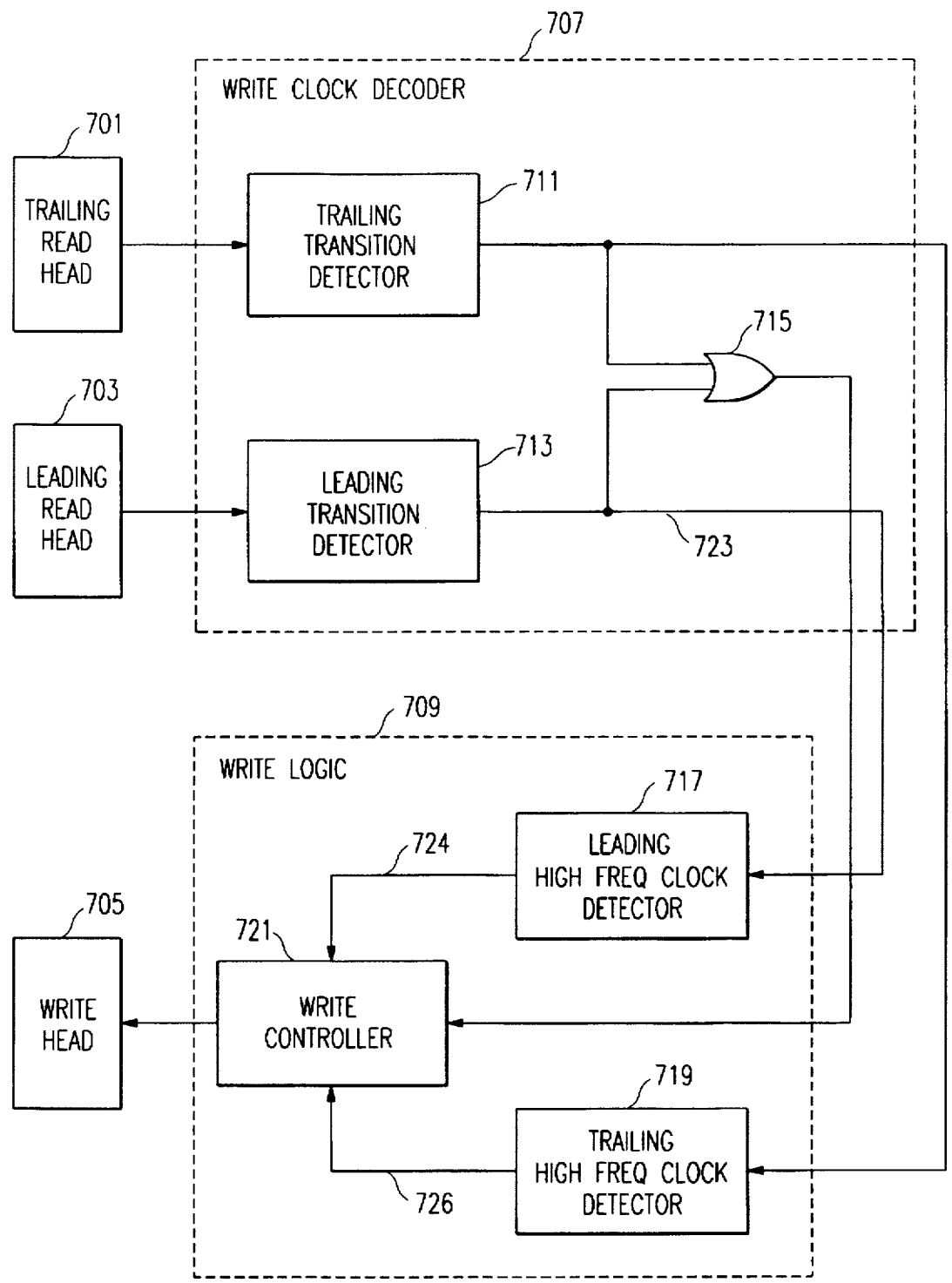
FIG. 7 is a functional block diagram of a fourth embodiment of this invention.

FIG. 7 is a functional block diagram of a fourth embodiment of this invention, which includes a write head 705, a leading read head 703, a trailing read head 701, a write clock decoder 707, and write logic 709. The write clock decoder 707 includes a trailing transition detector 711, a leading transition detector 713, and an OR-gate 715. The write logic 709 preferably includes a leading high frequency clock detector 717, a trailing high frequency clock detector 719, and a write controller 721.

The fourth embodiment of this invention allows information to be written at regular predetermined intervals on a magnetic medium, such as a magnetic stripe, without controlling the velocity of the medium with respect to the read/write apparatus in the absence of preexisting data. It should be noted that each of the embodiments described above rely upon preexisting data which must be read in order to generate a write pulse waveform used by the write logic 509 to time the writing of data by the write head 505. The embodiment illustrated in FIG. 7 does not rely on such preexisting data. Rather, the write head 705 leads the two read heads 701, 703 and writes a high frequency pattern which is then read by the two read heads which follow. That is, the medium passes first over the write head 705 and then over the leading read head 703 and finally over the trailing read head 701. Note that this direction is opposite of the direction that the medium moves with respect to the read/write apparatus in the first three embodiments described above.

Figure 8:
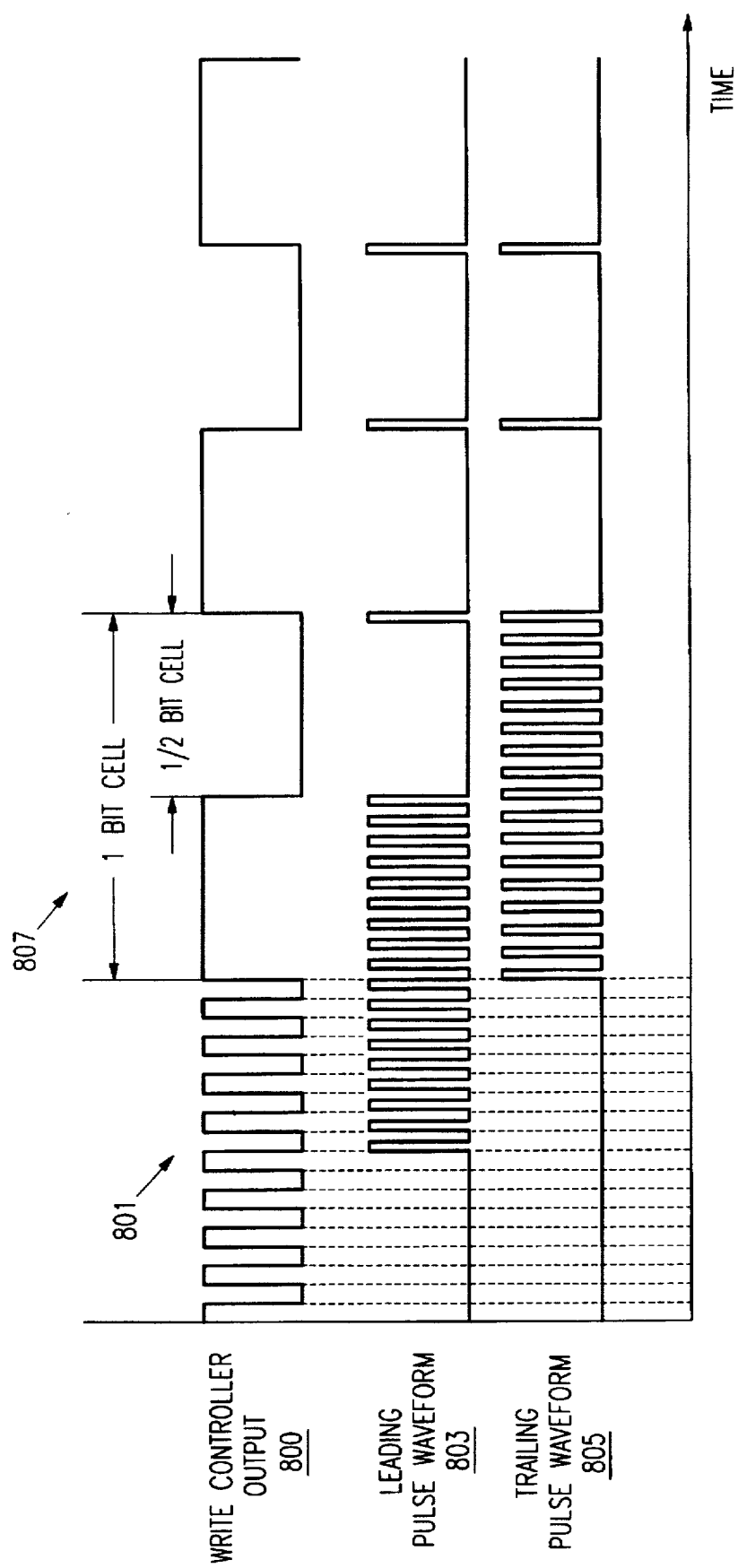
FIG. 8 is a timing diagram of some of the signals that are relevant to the embodiment of this invention shown in FIG. 7, including a signal representative of the high frequency pattern which the write controller couples to the write head.

Initially, the write controller 721 commands the write head to write a high frequency pattern which transitions from a first logical state to a second logical state at a rate of approximately 50 times the track bit density. At a track bit density of 75 BPI and with a maximum velocity of 50 IPS the write frequency is 187,500 Hz. A much lower frequency in the range of 2 times the track bit density of 7500 Hz could also be used. The higher frequency is used to prevent conventional readers from misinterpreting the few transitions left on the track in the embodiment not using the second write head. In the low frequency case a timer is used to measure the difference at the read heads between the written frequency and the desired bit cell placement. FIG. 8 is a timing diagram of some of the signals that are relevant to the fourth embodiment of this invention, including a signal representative of the high frequency pattern 801 which the write controller 721 couples to the write head 705. When this high frequency pattern 801 is detected at the leading read head 703, the leading transition detector 713 will receive the pattern and provide a leading pulse waveform 803. Each pulse output from the leading transition detector 713 is generated in response to a transition detected at the leading read head 703. Both the leading and the trailing transition detectors are similar to the transition detectors 511, 513 discussed above.

It should be noted that the transitions output from the write controller 721 will not necessarily be coincident with the pulses generated by the leading transition detector 713, since the velocity of the read/write head is uncontrolled. However, in order to illustrate the fact that one pulse is generated for each transition of the write controller output 800, the leading pulse waveform 803 has been shown in FIG. 8 to have each pulse coincide with a transition of the write controller output 800. The fact that there is a delay between the time the first transition is written by the write head 705 and the time the first pulse is generated (i.e., the time the first transition is detected at the leading read head 503) is illustrated in FIG. 8.

The output from the leading transition detector 713 is coupled to the leading high frequency clock detector 717 over a signal line 723. The leading high frequency clock detector 717 asserts a "Detect" signal to the write controller 721 over a signal line 724 upon detecting the presence of the high frequency clock on signal line 723. In an alternative embodiment of this invention, the output from the leading read head 703 is coupled directly to the leading high frequency clock detector 717, which then asserts the Detect signal upon detecting the high frequency clock signal from the leading read head 703. Similarly, once the trailing read head is over that portion of the medium on which the high frequency pattern was written, the trailing transition detector 711 outputs a trailing pulse waveform 805 in which a pulse is generated for each transition of the high frequency pattern 801. The trailing transition detector 711 couples the trailing pulse waveform 805 to the trailing high frequency clock detector 719, which asserts a Detect signal to the write controller 721 over signal line 726 upon receipt of the high frequency pulse stream of the trailing pulse waveform 805. As shown in FIG. 8, there is a delay between the time the leading read head and the trailing read head detect the high frequency pattern 801. If the distance between the leading and trailing read heads 703, 701 is known, then by measuring this delay, the velocity of the read/write apparatus at the time the pattern was written can be determined. Furthermore, by comparing the frequency at which the pattern is read with the frequency at which the pattern was written, any change in velocity between the time the pattern was written and the time pattern was read can be determined. Thus, the velocity of the read/write apparatus at the time the pattern is read can be determined. By continuously measuring the difference in the frequency at which the high frequency pattern was written and the frequency at which the high frequency pattern is read, the current velocity of the read/write apparatus can be determined.

In accordance with the preferred embodiment of this invention, the delay is measured by counting how many high frequency pulses were output from the leading transition detector 713 before the Detect signal was asserted by the trailing high frequency clock detector 719. Once the Detect signal has been asserted by the trailing high frequency clock detector 719, the write controller 721 can begin writing data, using a calculation of the current velocity of the read/write apparatus to determine when to write each transition (i.e., when a half bit cell has passed with respect to when the last transition has been written). Preferably, the high frequency pattern 801 is written over a length of the medium that is at least as long as the distance between the leading and trailing read heads 703, 701. In such a case, once the high frequency pattern ceases in the leading pulse waveform 803, the trailing pulse waveform 805 is used to determine the current velocity of the read/write apparatus (i.e., when the next half bit cell is to occur), and thus the write controller 721 determines when to cause each magnetic flux transition to be written by the write head 705 by counting the number of pulses received from the trailing transition detector 711 and the relative frequency of the pulses with respect to the frequency at which the pulses were written.

The output from each transition detector 711, 713 is coupled to the input of the OR-gate 715. Therefore, once both the leading and trailing read heads 703, 701 are detecting the transitions of the data 807 written by the write head 705, the output from the OR-gate 715 determines when each half bit cell occurs in the same manner as described above. Accordingly, the output from the OR-gate 715 is coupled to the write controller 721 and used as a write clock to synchronize the write controller 721 to the bit cells. The write controller 721 determines that neither read head is reading the high frequency pattern by noting that the Detect signals from both the leading and trailing high frequency clock detectors have been deasserted.

Fifth Embodiment

Figure 9:
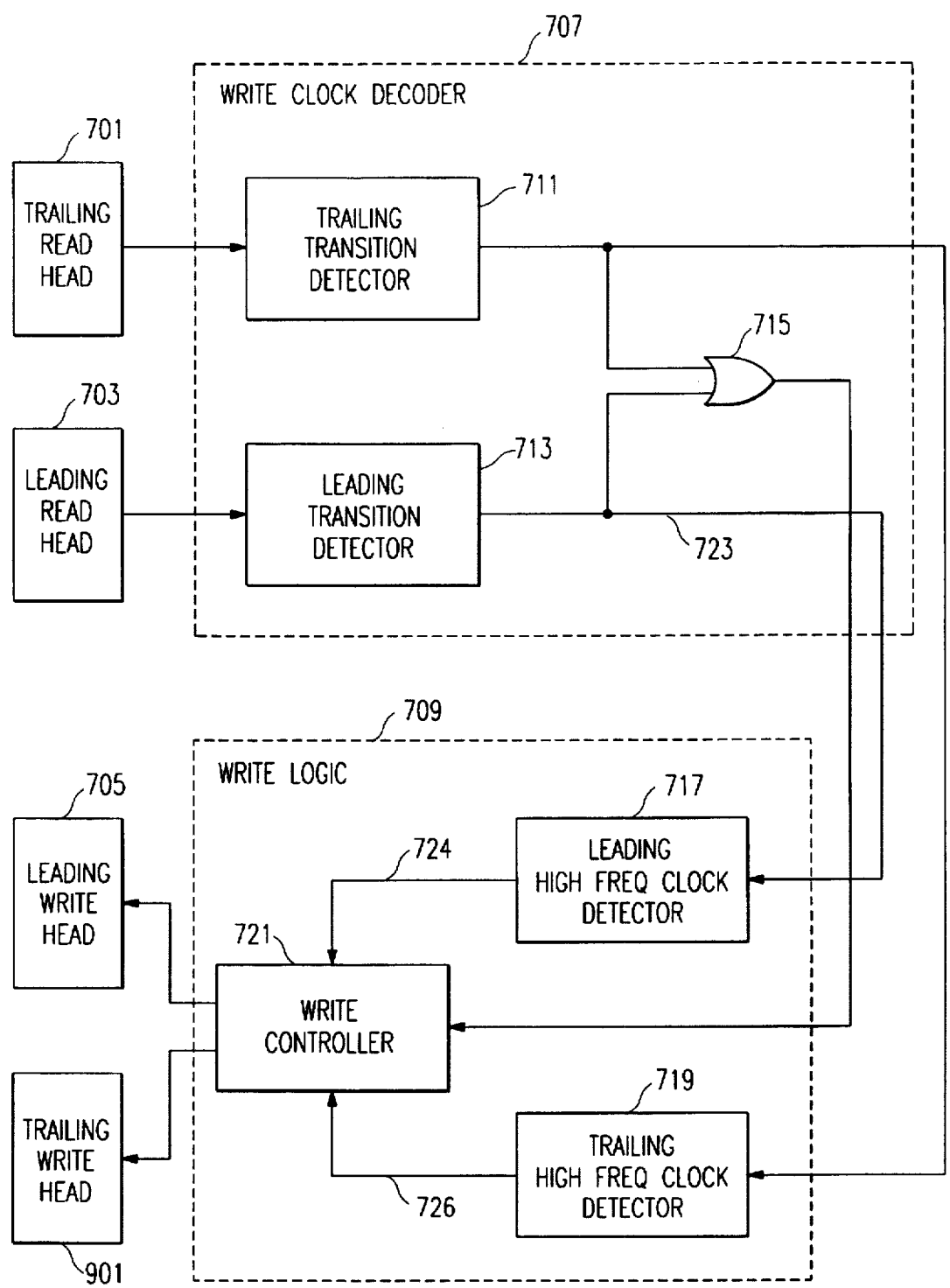
FIG. 9 is a functional block diagram of a fifth embodiment of this invention.
Figure 10:
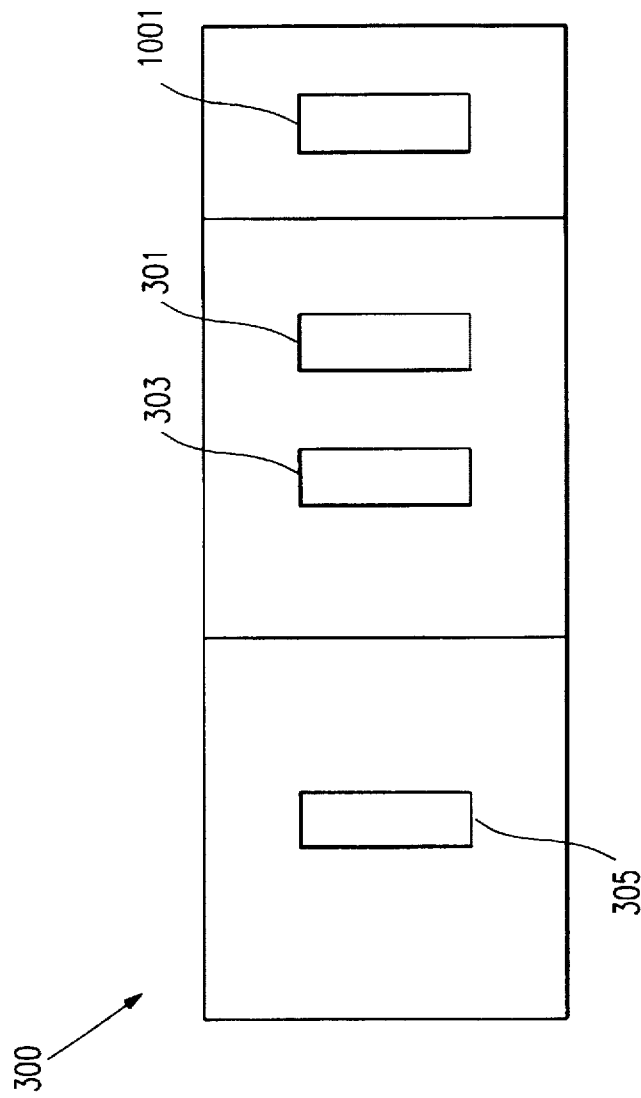
FIG. 10 is an illustration of the spatial relationship between each read gap and each write gap of the read/write apparatus in accordance with the embodiment of this invention shown in FIG. 9.

FIG. 9 is a functional block diagram of a fifth embodiment of this invention, wherein a second write head 901 is provided which trails the trailing read head 701. FIG. 10 is an illustration of the spacial relationship between each read gap and each write gap of the read/write apparatus in accordance with the fifth embodiment. As shown in FIG. 10, a second write gap 1001 (which is included in the second write head 901) is located at the opposite end of the read/write apparatus 300 from the first write gap 305. The second write head 901 allows the high frequency pattern to be overwritten by data. That is, as soon as the Detect signal is asserted by the trailing high frequency clock detector 719, the write controller ceases writing the high frequency pattern with the leading write head 705 and begins writing the data with the trailing write head 901. It should be clear that the data is written starting at a location on the magnetic medium that is before the location at which the high frequency pattern began by a distance equal to the distance between the trailing read head 701 and the trailing write head 901. In an alternative embodiment, the write controller 721 delays the write data by an amount which causes the trailing write head 901 to begin writing data at the same location at which the leading write head 705 began writing the high frequency pattern 801. This delay ensures that the trailing write head 901 is over a portion of the magnetic medium which can be magnetized (i.e., ensures that the trailing write head is does not attempt to write data before that head is over the magnetic medium).

Sixth Embodiment

Figure 11:
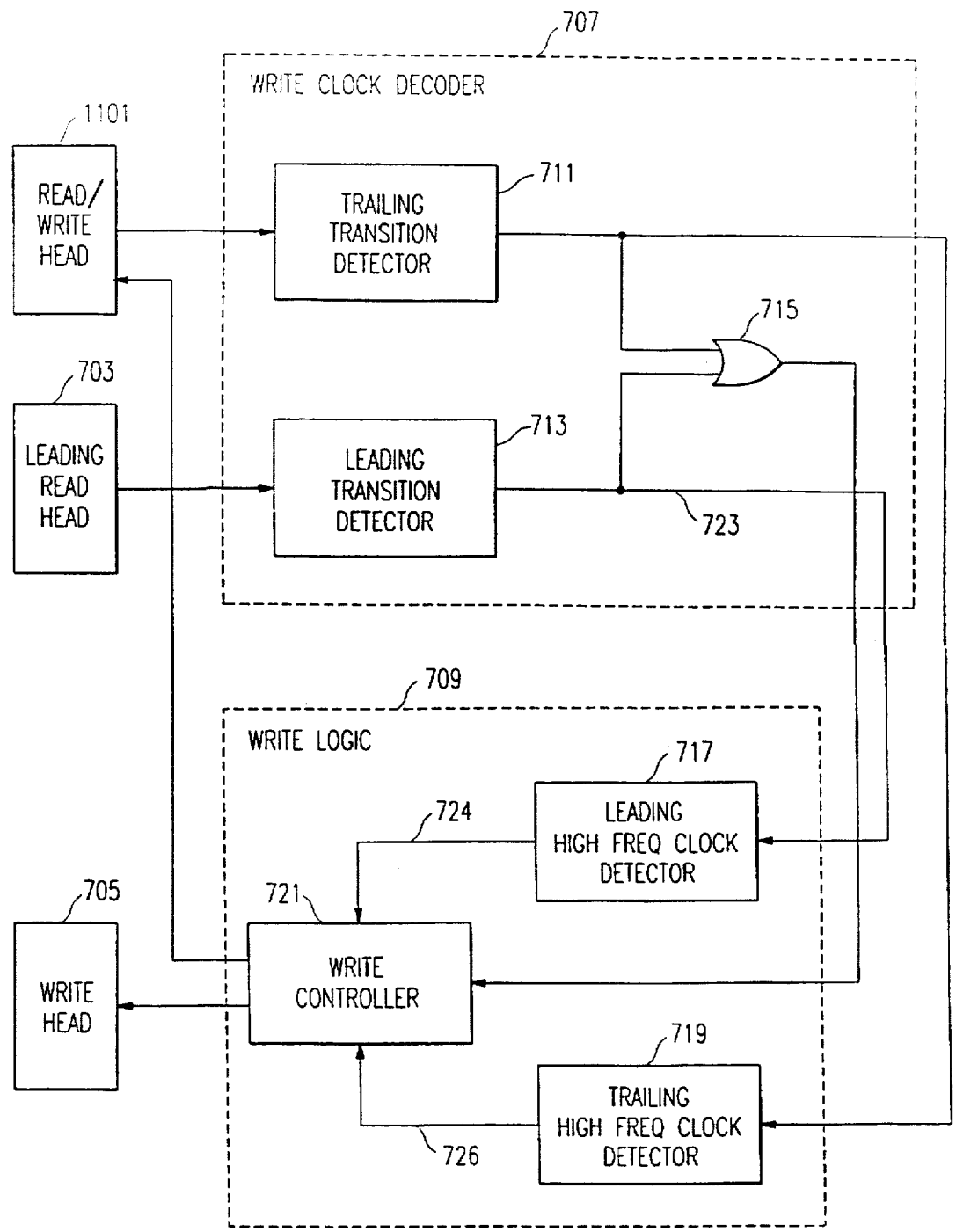
FIG. 11 is a functional block diagram of a sixth embodiment of this invention.

FIG. 11 is a functional block diagram of a sixth embodiment of this invention. In accordance with the sixth embodiment, a read head 703, a write head 705 and a read/write head 1101 are provided, in addition to the apparatus which was discussed in connection with the embodiment shown in FIG. 7. The embodiment of FIG. 11 operates essentially as does the embodiment of FIG. 9. However, the trailing read head 701 and the trailing write head 901 of FIG. 9 are replaced with a single read/write head 1101 which is capable of first reading, and then later, writing. In addition, once the Detect signal is asserted by the trailing high frequency clock detector 719, the write controller 721 causes the write head 705 to write a pattern of logical ones. Since logical ones have a transition each half bit cell, the leading transition detector 713 provides an output which has a pulse every half bit cell. This output is then coupled to the write controller 713 over signal line 1103 and used as a write clock.

Once the Detect signal from the leading high frequency clock detector is deasserted, indicating that the high frequency pattern 801 is no longer being read by the read head 703, the write controller begins controlling the read/write head 1101 to write data in synchronization with the write clock provided on signal line 1103.

Seventh Embodiment

Figure 12:
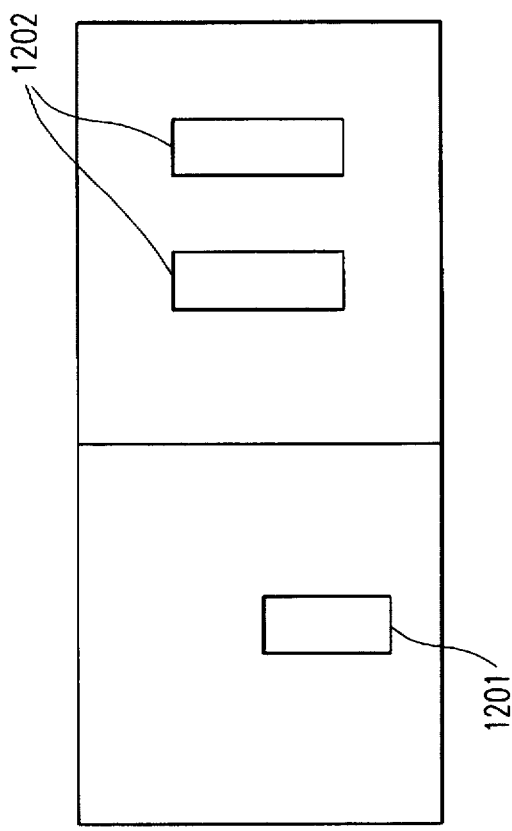
FIG. 12 is an illustration of the relative locations of read and write gaps within a read/write apparatus in accordance with a seventh embodiment of this invention.

FIG. 12 is an illustration of the relative locations of read and write gaps within a read/write apparatus in accordance with a seventh embodiment of this invention. As seen in FIG. 12, the write gap 1201 is aligned with a different track of information than are the read gaps 1202. Accordingly, information which was previously recorded on a first track may be read and used to generate a write clock which allows new information to be recorded on a second adjacent track. It should be noted that the bit cells used to record the data on the two tracks need not be identical, as long as they are each known.

Summary

A number of embodiments of this invention have been described. Nevertheless, it will be understood that various modifications may be made without departing from the spirit and scope of the invention. For example, a single processing device may be used to implement each of the functional blocks described, such as the write controller, the transition detectors, etc. Furthermore, these functions may be combined in more than one processing device in any combination. For example, a first processing device may perform the functions of the write clock decoder and read data decoder, while a second processing device performs the functions of the data comparator and delay logic. Still further, it should be understood that while this invention is described in the context of a magnetic medium and magnetic read and write heads, this invention is applicable to any means for reading and writing data in which an Aiken code may be used. For example, such means might be bar codes written on paper, optically encoded data, etc. In yet another alternative embodiment of this invention, the read and write heads might move with respect to the medium. Accordingly, it is to be understood that the invention is not to be limited by the specific illustrated embodiments, but only by the spirit and scope of the appended claims.

What is claimed is:

1. An apparatus for reading and writing data on a magnetic medium, comprising:
   (a) a first read head having an output;
   (b) a second read head having an output, spaced an odd integer multiple of one half a bit cell from first read head;
   (c) a write head, spaced a known distance from the second read head;
   (d) a write clock decoder having an output, and a first and second input, the first input being coupled to the first read head and the second input being coupled to the second read head, the write clock decoder comprising:
      (1) a first transition detector having an input and an output, the input being coupled to the first read head;
      (2) a second transition detector having an input and an output, the input being coupled to the second read head; and
      (3) a logical OR-gate having an output, and a first and second input, the first input being coupled to the output of the first transition detector, and the second input being coupled to the output of the second transition detector; and
   (e) write logic coupled to the write head and the output of the write clock decoder;
   whereby the output from the write clock decoder synchronizes write operations controlled by the write logic and performed by the write head.

2. The apparatus of claim 1, wherein the first transition detector is a programmable device which detects a change of state from a first logic state to a second logic state change in a signal coupled to the input of the first transition detector.

3. The apparatus of claim 1, wherein the second transition detector is a programmable device which detects a state change in a signal coupled to the input of the second transition detector, from a first logic state to a second logic state.

4. The apparatus of claim 1, wherein the first transition detector is a circuit comprising discrete logic.

5. The apparatus of claim 4, wherein the first transition detector comprises:
   (a) an inverter having an input and an output, the input being coupled to the first input of the first transition detector; and
   (b) an exclusive OR-gate having an output, and a first and second input, the first input being coupled to the output of the first inverter, and the second input being coupled to the input of the first transition detector.

6. The apparatus of claim 5, wherein the propagation delay through the inverter is sufficiently long to cause a detectable pulse at the output of the exclusive OR-gate each time a signal at the input to the first transition detector changes logical state.

7. The apparatus of claim 4, wherein the second transition detector comprises:
   (a) an inverter having an input and an output, the input being coupled to the first input of the second transition detector; and
   (b) an exclusive OR-gate having an output and a first and second input, the first input being coupled to the output of the first inverter, and the second input being coupled to the input of the second transition detector.

8. The apparatus of claim 7, wherein the propagation delay through the inverter is sufficiently long to cause a detectable pulse at the output of the exclusive OR-gate each time a signal at the input to the second transition detector changes state.

9. The apparatus of claim 1, wherein the first transition detector is a dual-edge triggered monostable multi-vibrator.

10. The apparatus of claim 1, wherein the first transition detector comprises:
    (a) a first single-edge triggered monostable multi-vibrator having an input and an output, the input being coupled to the input of the first transition detector;
    (b) an inverter having an input and an output, thy input being coupled to the input of the first transition detector;
    (c) a second single-edge triggered monostable multi-vibrator having an input and an output, the input being coupled to the output of the inverter; and
    (d) a logical OR-gate having an output and a first and second input, the first input being coupled to the output of the first single-edge triggered monostable multi-vibrator, the second input being coupled to the output of the second single-edge triggered monostable multi-vibrator, and the output being coupled to the output of the first transition detector.

11. The apparatus of claim 1, further comprising:
    (a) a write sub-clock; and
    (b) delay logic, coupled to the write sub-clock and to the write logic, for delaying the beginning of a write operation by the write logic a predetermined amount of time, the predetermined amount of time being determined by the distance between the second read head and the write head, and further by the number of write sub-clock periods which occur between transitions of the write clock.

12. The apparatus of claim 11, further comprising:
    (a) a read data decoder having an output and a first and second input, the first input being coupled to the first read head and the second input being coupled to the second read head;
    (b) a data comparator having an input and an output, the input being coupled to the output of the read data decoder, and the output being coupled to the delay logic, the data comparator for comparing data received from the read data decoder to the data to be written and indicating to the delay logic when the read data differs from the data to be written, wherein the delay logic signals the write logic to begin the write operation a predetermined amount of time after receipt of the indication from the data comparator.

13. The apparatus of claim 12, wherein:
    (a) the data comparator is further for indicating to the delay logic when the read data is the same as the data to be written; and
    (b) the delay logic signals the write logic to cease the write operation a predetermined amount of time after the receipt of the indication from the data comparator that the data that has been read is the same as the data to be written, such that only that data which is to be modified is overwritten.

14. An apparatus for reading and writing data on a magnetic medium, comprising:

(a) a first read head having an output;

(b) a second read head spaced an odd integer multiple of one half the bit cell length from first read head, the second read head having an output;

(c) a first write head, spaced a known distance from the second read head;

(d) a write clock decoder having a first output, a second output, a third output, a first input, and a second input, the first input being coupled to the first read head and the second input being coupled to the second read head, the write clock decoder comprising:

(1) a first transition detector having an input and an output, the input being coupled to the first read head, and the output being coupled to the first output from the write clock decoder;

(2) a second transition detector having an input and an output, the input being coupled to the second read head and the output being coupled to the second output of the write clock decoder; and (3) a logical OR-gate having an output, and a first and second input, the first input being coupled to the output of the first transition detector, the second input being coupled to the output of the second transition detector, and the output being coupled to the third output of the write clock decoder; and (e) write logic having three inputs, the first input being coupled to the first output of the write clock decoder, second input being coupled to the second output of the write clock decoder, and the third input being coupled to the third output of the write clock decoder, the write logic comprising:

(1) a first high frequency clock detector having an input and an output, the input being coupled to the first input of the write logic;

(2) a second high frequency clock detector having an input and an output, the input being coupled to the second input of the write logic; and (3) a write controller having a first input, a second input, a third input, and an output, the first input being coupled to the output of the first high frequency clock detector, the second input being coupled to the output of the second high frequency clock detector, and the third input being coupled to the third input to the write logic, the write controller for:

(i) causing the first write head to start writing a high frequency pattern of flux transitions;

(ii) receiving an indication from the first high frequency clock detector that the first read head has begun reading the high frequency pattern of flux transitions;

(iii) receiving an indication from the second high frequency clock detector that the second read head has begun reading the high frequency pattern of flux transitions;

(iv) counting the number of high frequency flux transitions that have been read by the first read head between the time the indication has been received from the first high frequency clock detector and the time the indication has been received from the second high frequency clock detector;

(v) causing the first write head to stop writing the high frequency pattern and start writing a low frequency pattern of flux transitions, each transition of the low frequency pattern occurring at a predetermined interval, the predetermined interval being a function of (1) the spacing between the first and second read heads, (2) the number of high frequency flux transitions which were read between the time the indication has been received from the first high frequency clock detector and the time the indication has been received from the second high frequency clock detector, and (3) the frequency of the high frequency pattern, such that the frequency of the low frequency pattern will be equal to the frequency of the write clock, adjusted for the relative speed of the first write head with respect to the medium;

(vi) receiving an indication from the second high speed clock detector that the second read head is no longer reading high frequency flux transitions; and (vii) causing the first write head to begin writing data synchronized with a write clock received at the third input to the write controller after receipt of the indication that the second high speed clock detector is no longer reading high frequency flux transitions.

15. The apparatus of claim 14, further including a second write head having an input, the input being coupled to the write logic, wherein the first and second read heads are located between the first and second write heads, and the write logic causes the second write head to write the data synchronized with the write clock received at the third input to the write at the third input to the write controller after receipt of the indication that the second high speed clock detector is no longer reading high frequency flux transitions.

16. An apparatus for reading and writing data on a magnetic medium, comprising:

(a) a write head having an input;

(b) a read head having an output, the read head being spaced a predetermined distance from the write head;

(c) a read/write head having an input and an output, the read/write head being spaced an odd number of multiples of one half the bit cell length from the read head;

(d) a write clock decoder having a first output, a second output, a third output, a first input, and a second input, the first input being coupled to the read head and the second input being coupled to the read/write head, the write clock decoder comprising:

(1) a first transition detector having an input and an output, the input being coupled to the read head, and the output being coupled to the first output from the write clock decoder;

(2) a second transition detector having an input and an output, the input being coupled to the read/write head and the output being coupled to the second output of the write clock decoder; and (3) a logical OR-gate having an output, and a first and second input, the first input being coupled to the output of the first transition detector, the second input being coupled to the output of the second transition detector, and the output being coupled to the third output of the write clock decoder; and (e) write logic having three inputs, the first input being coupled to the first output of the write clock decoder, second input being coupled to the second output of the write clock decoder, and the third input being coupled to the third output of the write clock decoder, the write logic comprising:

(1) a first high frequency clock detector having an input and an output, the input being coupled to the first input of the write logic;

(2) a second high frequency clock detector having an input and an output, the input being coupled to the second input of the write logic; and (3) a write controller having a first input, a second input, a third input, and an output, the first input being coupled to the coupled to the output of the first high frequency clock detector, and the second input being coupled to the output of the second high frequency clock detector, and the third input being coupled to the third input to the write logic, the write controller for:

(i) causing the write head to start writing a high frequency pattern of flux transitions;

(ii) receiving an indication from the first high frequency clock detector that the read head has begun reading the high frequency pattern of flux transitions;

(iii) receiving an indication from the second high frequency clock detector that the read/write head has begun reading the high frequency pattern of flux transitions;

(iv) counting the number of high frequency flux transitions that have been read by the read head between the time the indication has been received from the first high frequency clock detector and the time the indication has been received from the second high frequency clock detector;

(v) causing the write head to stop writing the high frequency pattern and start writing a low frequency pattern of flux transitions, each transition of the low frequency pattern occurring at a predetermined interval, the predetermined interval being a function of (1) the spacing between the first and read/write heads, (2) the number of high frequency flux transitions which were read between the time the indication has been received from the first high frequency clock detector and the time the indication has been received from the second high frequency clock detector, and (3) the frequency of the high frequency pattern, such that the frequency of the low frequency pattern will be equal to the frequency of the write clock, adjusted for the relative speed of the write head with respect to the medium;

(vi) receiving an indication from the second high speed clock detector that the read/write head is no longer reading high frequency flux transitions; and (vii) causing the read/write head to begin writing data synchronized with a write clock received at the third input to the write controller after receipt of the indication that the second high speed clock detector is no longer reading high frequency flux transitions.

\* \* \* \* \*